March 11, 1930.  C. E. WHITE  1,750,033
COMBINED MOWER AND WINDROWER
Original Filed Nov. 8, 1918    6 Sheets-Sheet 1
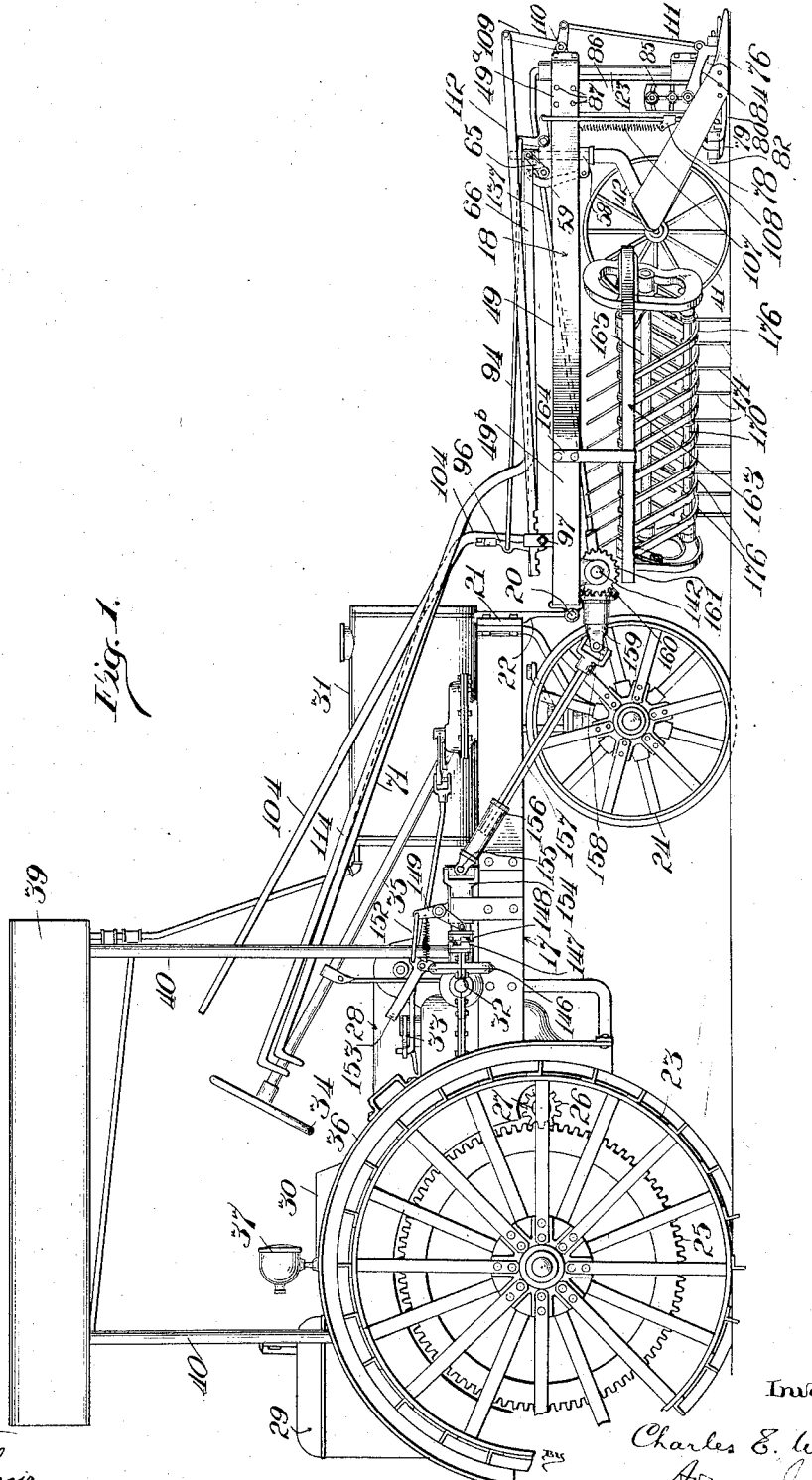

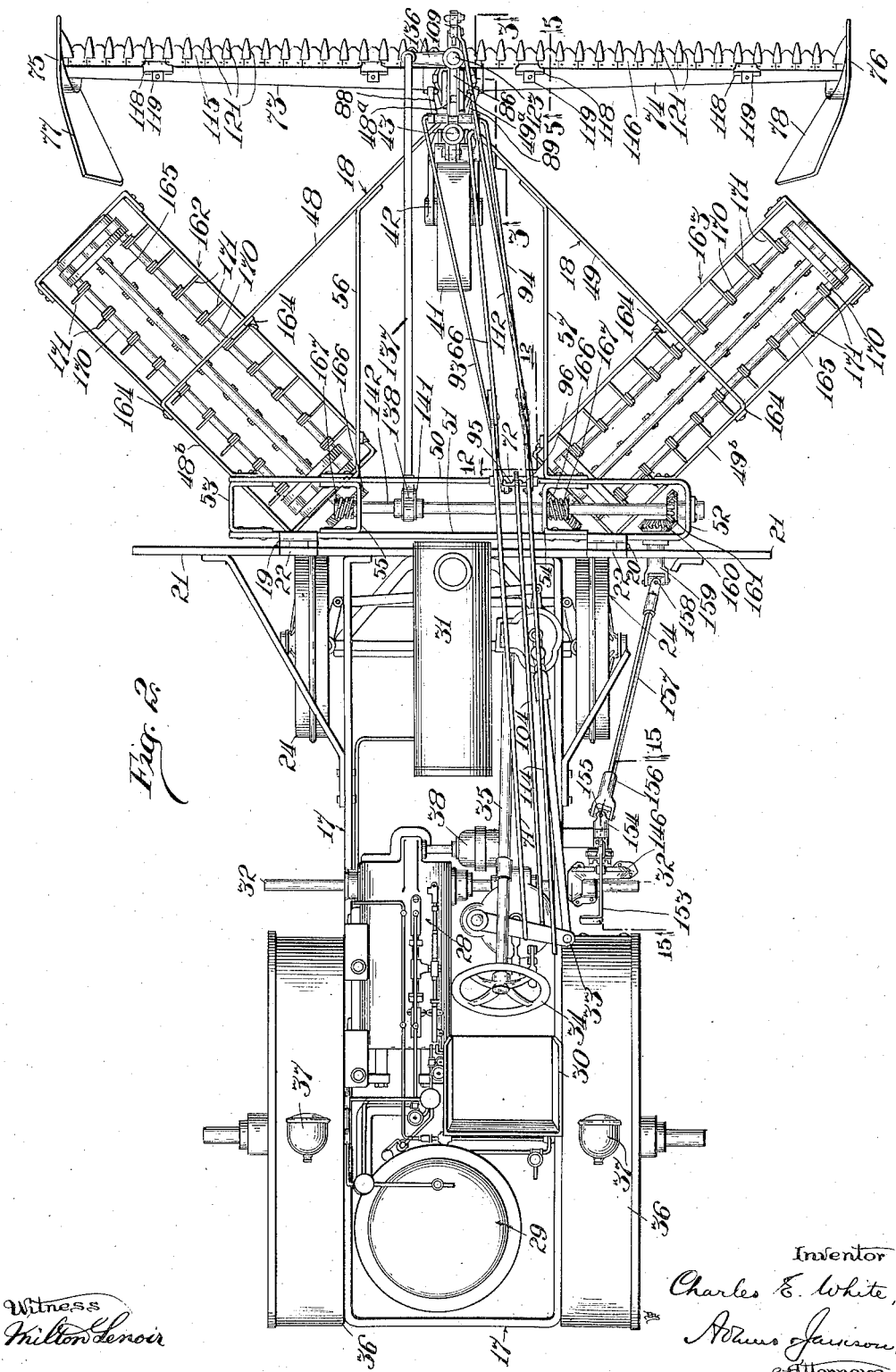

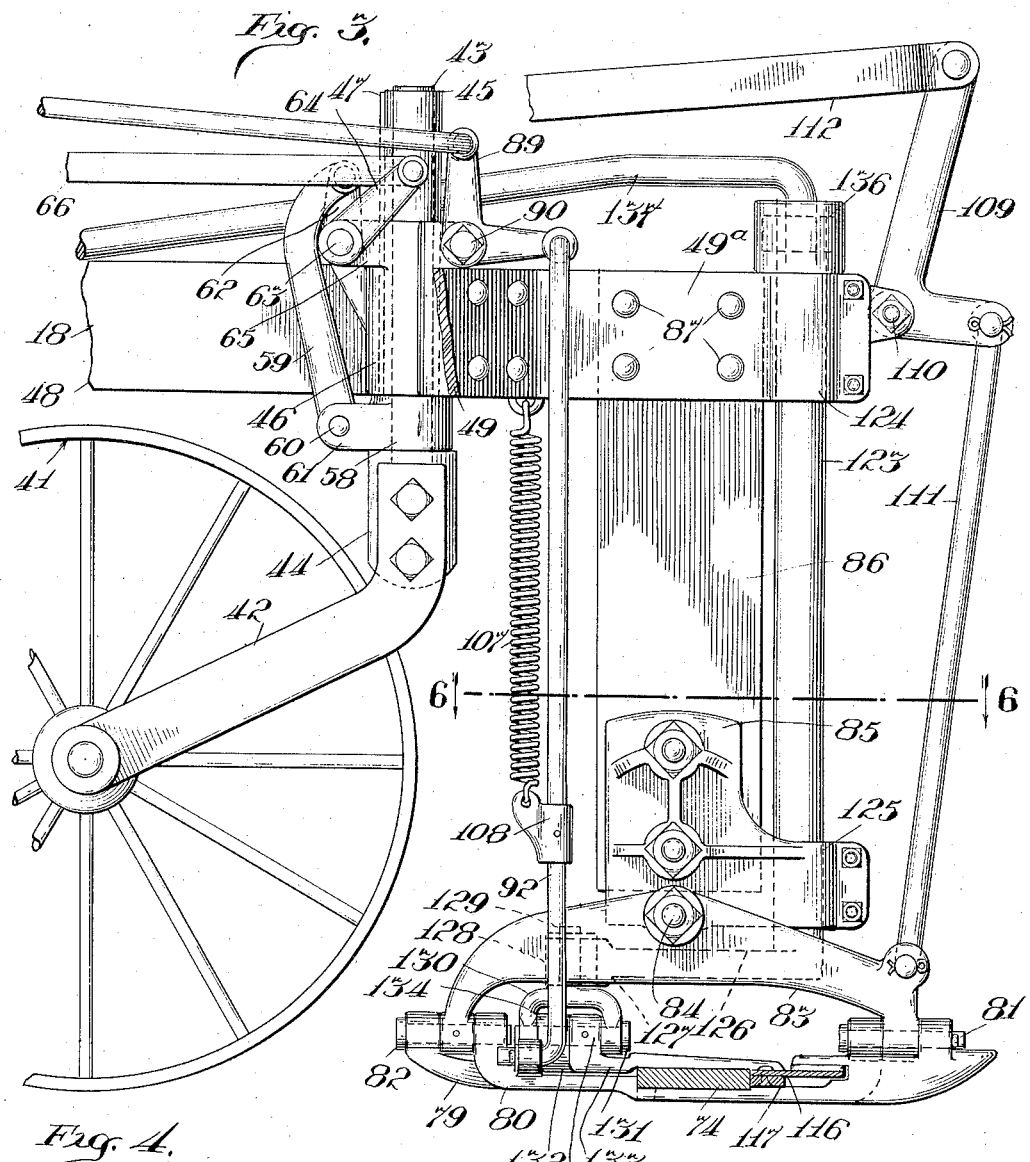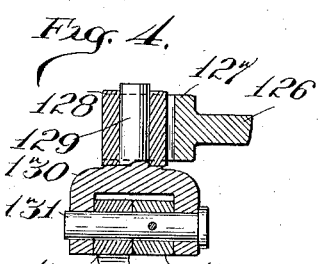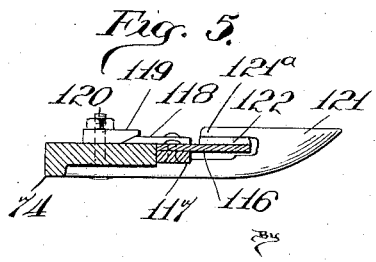

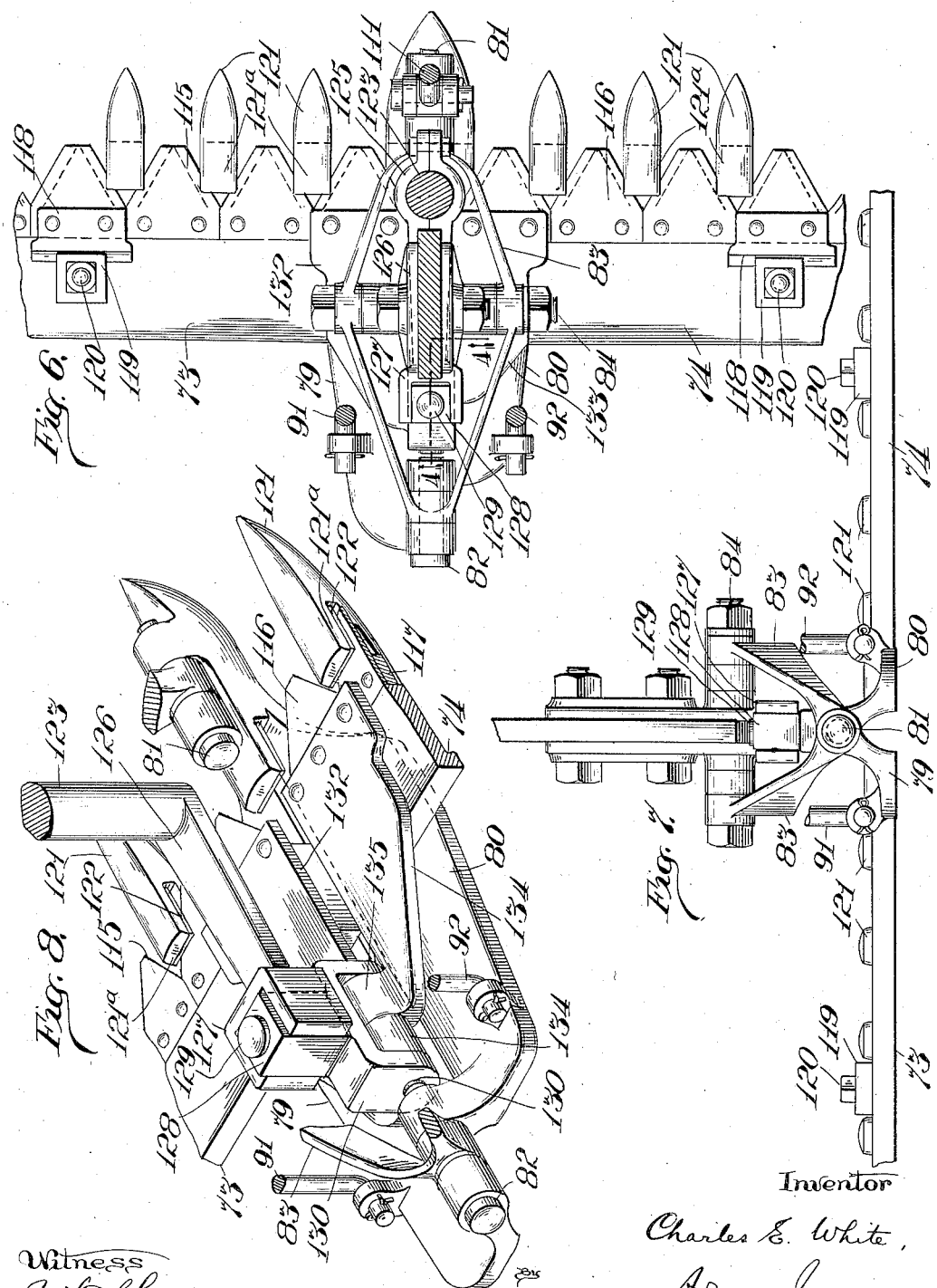

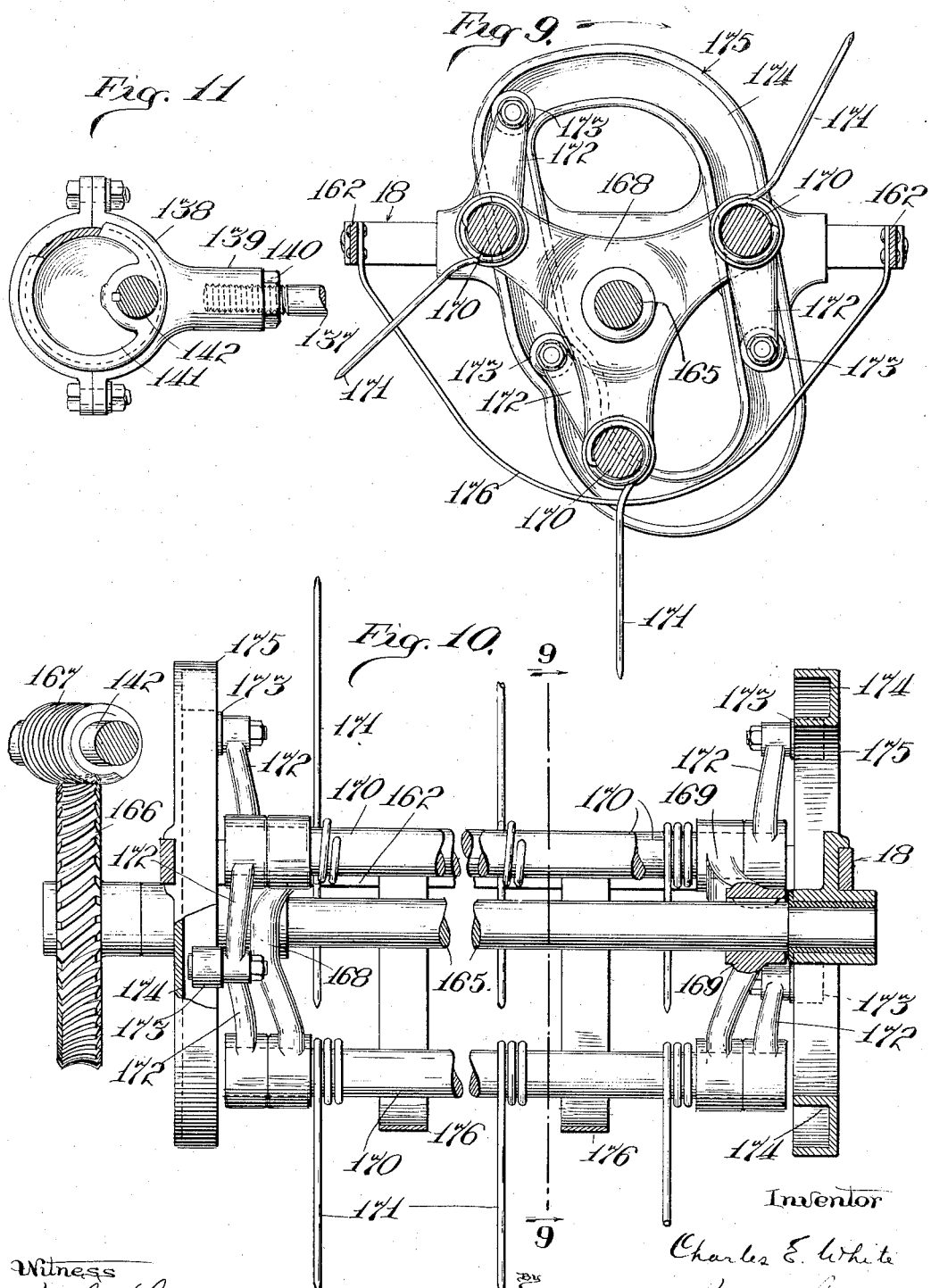

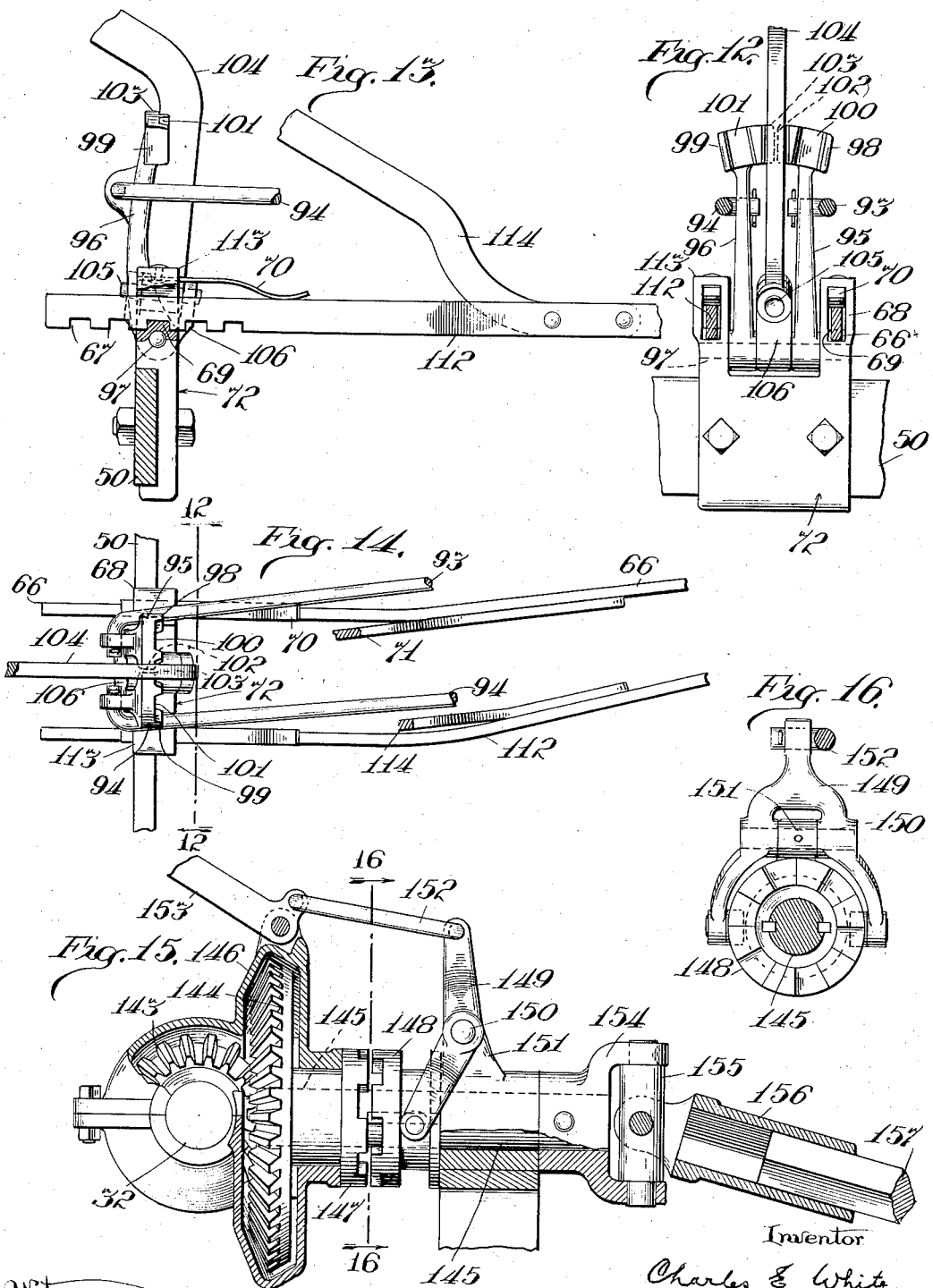

Patented Mar. 11, 1930

1,750,033

UNITED STATES PATENT OFFICE

CHARLES E. WHITE, OF MOLINE, ILLINOIS, ASSIGNOR TO DEERE & COMPANY, OF MOLINE, ILLINOIS, A CORPORATION OF ILLINOIS

COMBINED MOWER AND WINDROWER

Application filed November 8, 1918, Serial No. 261,657. Renewed August 29, 1927.

My invention relates to agricultural implements, and has more particularly to do with hay machinery. It has for its object to provide a new and improved machine of the latter class possessing a number of valuable characteristics, chief of which are the following: The combination with a power-propelled element such as a tractor, of means arranged in advance thereof for cutting the hay and raking it into windrows lying within the track of the tractor element, so that the hay will not be damaged by the passage over it of the wheels of the tractor; the provision between the tractor element and a cutting element such as a mower arranged in advance of the tractor, of oppositely-disposed raking devices which operate to loosen the hay and rake it into windrows; the provision of means by which the motor or other source of power employed for driving the tractor element in a machine of the type referred to also serves to drive the cutting mechanism of the mower and the raking devices; the combination with a tractor frame, of a combined raker and mower frame arranged to be operatively connected with the tractor frame in advance thereof so that the operating parts of the mower and raker may be driven from the motor which drives the tractor, and which nevertheless may readily be disconnected from the tractor so that the latter may be conveniently used in driving other machinery or implements; and the provision in a machine of the type referred to of means by which the operator may from his seat conveniently control the operation of the mower and raker. In addition to providing a machine having these general characteristics, it is also my object to provide certain improvements in the construction and operation of certain parts of the machine which will be pointed out in connection with the description of the embodiment thereof illustrated in the accompanying drawings. What I regard as new will be particularly pointed out in the claims.

In the accompanying drawings:—

Fig. 1 is a side elevation of my improved machine;

Fig. 2 is a plan view thereof;

Fig. 3 is an enlarged detail, being substantially a longitudinal vertical section on line 3—3 of Fig. 2;

Fig. 4 is a detail, being a partial longitudinal section on line 4—4 of Fig. 6;

Fig. 5 is a vertical cross section on line 5—5 of Fig. 2;

Fig. 6 is a partial longitudinal section on line 6—6 of Fig. 3;

Fig. 7 is an enlarged rear view showing the inner end portions of the finger bars and their connections;

Fig. 8 is a perspective view illustrating the mechanism for reciprocating the sickle bars and also the manner in which the finger bars are mounted;

Fig. 9 is a vertical section on line 9—9 of Fig. 10, illustrating the construction of one of the rakers;

Fig. 10 is an elevation of one of the rakers partly broken away, and some parts being in section;

Fig. 11 is a detail, illustrating the eccentric by which the sickle bars are reciprocated;

Fig. 12 is a detail, being a view taken on line 12—12 of Figs. 2 and 14, illustrating the devices employed for swinging either or both finger bars vertically;

Fig. 13 is principally a side elevation of the parts shown in Fig. 12, some parts being, however, shown in section;

Fig. 14 is a plan view of the parts shown in Fig. 13;

Fig. 15 is substantially a horizontal vertical section on line 15—15 of Fig. 2, showing the mechanism through which the rakers are driven from the motor which drives the tractor; and Fig. 16 is a vertical cross section on line 16—16 of Fig. 15, showing one of the clutch members illustrated in Fig. 15 and the yoke by which such clutch member is shifted.

My improved machine comprises a rear or tractor frame 17 and a front or mower and raker frame 18, these two frames being pivotally connected together at the opposite sides of the machine by pivots 19—20, as shown in Figs. 1 and 2. As it is desirable that the front frame 18 be somewhat lower than the rear frame 17, the latter frame is provided with a front cross bar 21, from which depend hangers 22, shown in Fig. 1, and the pivots 19—20 are connected with these hangers. The rear frame is mounted upon traction wheels 23, which, in the construction shown, are at the rear thereof, and steering wheels 24, which are illustrated as being at the front. This arrangement of the steering and traction wheels is, however, not essential to my invention, as, if desired, the traction wheels may be placed at the front and the steering wheel or wheels may be placed at the rear. The traction wheels are provided with gears 25 which mesh with pinions 26 carried by a transverse shaft 27 driven by a motor mounted on the rear frame 17. In the construction illustrated, the motor employed is a steam engine, but if preferred an internal combustion motor of any suitable type may be employed. In the illustrated construction 28 indicates the steam engine considered as a whole, and 29 indicates a boiler which supplies steam to the engine. The engine 28 is located at one side of the frame 17 intermediately of the length thereof, and the boiler 29 is preferably located at the rear end portion of said frame between the traction wheels 23. 30 indicates the driver's seat which is located in advance of the boiler 29 and at one side of the engine 28, as shown in Fig. 2. 31 indicates a water tank or reservoir which is preferably located at the forward end portion of the frame 17 and is suitably connected with the boiler 29. 32 indicates a transverse shaft from which power is transmitted to the operating parts of the implement or implements carried by the front frame, said shaft being driven by the steam engine 28 in any suitable way. 33 indicates an arm or lever arranged to be swung backward or forward by any suitable mechanism operated by the engine, the operation of which arm effects the steering of the front wheels by power. 34 indicates a hand steering wheel mounted on a steering post 35 for steering the front wheels by hand. As my invention contemplates the use of any approved construction for steering the front wheels by power and by hand, and is not concerned with the specific mechanism that may be provided for that purpose, it is not deemed necessary to describe it herein. 36 indicates mud guards or fenders for the traction wheels, and 37 indicates lamps mounted on said mud guards. 38 indicates a generator which is arranged to be operated in any suitable way from the motor 28 for supplying electric current to the lamps 37, as shown in Fig. 2. 39 indicates a canopy or top supported by posts 40 above the driver's seat, as shown in Fig. 1.

The forward portion of the front frame is adjustably supported by means of a caster wheel 41 mounted in a yoke 42 which is provided with a vertical spindle 43, as shown in Fig. 3. At the lower end of the spindle 43 is a head 44, upon which bears the lower end of a sleeve 45 fitted upon the spindle 43, and serving as a bearing therefor. This sleeve is mounted to slide longitudinally in a vertical bearing 46 secured to the forward portion of the front frame 18, as shown in Fig. 3, and is prevented from rotating therein by a feather or key 47. As shown in Fig. 2, the front frame comprises bars 48—49 which converge toward the front until they almost meet, and then extend forward in parallelism with each other, and the bearing 46 is secured between them. The parallel portions of the bars 48—49 are indicated by 48ª—49ª, respectively. The rear end portions of the bars 48—49 are bent inwardly at right angles, as shown at 48ᵇ—49ᵇ in Fig. 2, and are connected to the front bar 50 of a rectangular frame which extends transversely of the machine, as shown in Fig. 2. The rear bar of the latter frame carries the hinges or pivots 19—20, by which the front frame as a whole is connected with the tractor frame. Preferably the bars 50—51 are integrally united at one end, as shown at 52 in Fig. 2, and at their other ends they are connected by a brace 53. They are also connected intermediately by braces 54—55, as shown in said figure. 56—57 indicate longitudinally extending braces which connect the bar 50 with the bars 48—49, respectively.

58 indicates a collar or flange at the lower end of the sleeve 47, upon which the lower end of the bearing 46 rests, as shown in Fig. 3. From the foregoing description it will be apparent that the forward portion of the front frame is sustained by the caster wheel 41 through the collar 58 and the head 44. In order to adjust the forward portion of the front frame upon the sleeve 45, a link 59 is provided which is pivoted at its lower end upon a pivot 60 mounted in lugs 61 carried by the collar 58. The upper end of said lever is pivotally connected to an arm 62 carried by a rock-shaft 63, which also carries a crank 64. The rock-shaft 63 is disposed transversely of the machine and is journaled in suitable bearings provided in lugs 65, carried by the bearing 46. It will be evident from the foregoing description that by pulling back the crank 64 from the position shown in Fig. 3, the resulting downward thrust upon the link 59 will move the bearing 46 upward upon the sleeve 45, carrying with it the forward portion of the front frame. For operating the crank 64 to vertically adjust the front frame in the manner described, I provide an operating bar 66, shown in Figs. 1 and 3, the rear end of which is provided with notches at its under side, similar to those shown at 67 in Figs. 1 and 13. The notched portion of the bar 66 extends through a guide loop 68, shown in Fig. 12, and is adapted to engage a lug or tooth 69 which lies within said loop, in the manner shown in Fig. 13 in connection with a similar bar 112 hereinafter described, thereby locking the bar 66 against endwise movement. The loop 68 is large enough to permit the bar 66 to be lifted out of engagement with the tooth 69 to permit it to be moved endwise, but normally the bar 66 is held in its locked position by a spring 70 which bears down upon it, in the manner shown in Fig. 13 in connection with the bar 112. For actuating the bar 66 to unlock it and also to move it endwise, I provide a handle 71 which is connected to the bar 66 intermediately thereof and extends back to a point within convenient reach of the operator's seat, as shown in Figs. 1 and 2. Thus the operator may easily adjust the height of the forward portion of the front frame without leaving his seat. When the frame is so adjusted, the rear portion thereof rocks upon the pivots 19—20. The loop 68, as well as some other parts which will be hereinafter described, is carried by a bracket 72 which is secured to the cross bar 50, as shown in Figs. 2, 12, and 13, so that the bars 66 and 71 have no connection with the tractor frame. The object of this arrangement is to facilitate the disconnection of the front frame and the parts associated with it from the tractor frame when it is desired to use the tractor for some other purpose.

73—74 indicate two finger bars which extend transversely of the machine in alinement with each other, as shown in Fig. 2. Their inner ends adjoin, as shown in Figs. 6 and 8, so that the cutting devices extend substantially continuously across the front of the machine from one side thereof to the other. At their outer ends the finger bars 73—74 are provided with the usual shoes 75—76, from the rear portions of which extend inwardly inclined deflectors 77—78, as shown in Fig. 2. At their inner ends the finger bars 73—74 are provided respectively with shoes 79—80, which are pivoted to rock upon longitudinally extending front and rear pivots 81—82 in alinement with each other, as shown in Fig. 8, so that the outer ends of the finger bars may be swung vertically about said pivots. The pivots 81—82 are carried by a yoke or bracket 83 which is pivotally mounted intermediately upon a transversely-disposed pivot 84 carried by a bracket 85 secured to the lower end of a standard 86 which depends from the forward portion of the front frame, as shown in Fig. 3. This standard, which is preferably a substantial metal plate, extends between the members 48ª—49ª, and is secured thereto by rivets 87, as shown in Fig. 3. Thus the standard 86 is held rigidly in position at substantially the transverse center of the machine. For swinging the finger bars 73—74 vertically about the pivots 81—82, I provide bell-crank levers 88—89 mounted on a pivot 90 carried by the bearing 46, as shown in Fig. 3. Said bell-crank levers are connected respectively by links 91—92 with the shoes 79—80, as shown in Figs. 7 and 8, so that by rocking said levers in the appropriate direction the finger bars 73—74 may be swung upward. The levers 88—89 are connected by rods 93—94, respectively, to swinging arms 95—96 mounted on a pivot 97 carried by the bracket 72, as shown in Figs. 12 and 13. The arms 95—96 are vertically arranged, and at their upper ends are provided with heads 98—99 having notches 100—101, respectively. The heads 98—99 lie adjacent to each other, as shown in Fig. 14, and their adjacent margins are provided with lips 102—103 which approach each other closely, substantially forming a third notch between the two heads, as shown in the latter figure. It will be apparent that backward movement of either arm 95—96 alone will swing the finger bar connected with such arm upward, and that by moving both said arms back in unison, both finger bars will be simultaneously raised out of operative position. For the purpose of manipulating the arms 95—96 to adjust the position of the finger bars, an operating lever 104 is provided which is mounted to swing laterally upon a pivot 105 carried by an arm 106 mounted on the pivot 97 between the arms 95—96, as shown in Fig. 12. The lever 104 extends forward of the arms 95—96, and thence back to a point within convenient reach of the operator's seat, as shown in Figs. 1 and 2. If the operator wishes to lift the left hand finger bar as viewed in Fig. 2, he swings the lever 104 laterally into engagement with the notch 100 of arm 95, which arm is connected with the left hand finger bar. By then depressing the rear end of the lever 104, the arm 95 will be swung backward and the finger bar 73 raised. In like manner he may move the lever 104 into notch 101 and raise the other finger bar. By moving the lever 104 into the space between the two notches 100—101, it will engage both lips 102—103, and consequently will operate both arms 95—96 simultaneously thereby raising both finger bars. Preferably balancing springs 107 are provided for substantially floating the finger bars, these springs being connected at their upper ends to the forward portion of the front frame, and at their lower ends to collars 108 secured upon the rods 91—92, as shown in Fig. 3.

The yoke 83 is rocked about its pivot 84 to simultaneously vary the pitch of the finger bars and sickles by means of a bell-crank lever 109 which is mounted upon a pivot 110 at the forward portion of the front frame, as shown in Fig. 3. One arm of said lever is connected with the forward portion of the yoke 83 by a connecting rod 111, and an operating bar 112 is connected to the other arm of said lever and extends back through a loop 113 carried by the bracket 72, as shown in Figs. 12 and 14. The operating bar 112 is similar in construction to the bar 66, being provided with the teeth 67 on its under side adapted to engage a lug 69 at the under side of said loop, as shown in Fig. 13 and as described in connection with the bar 66. A hand lever 114 is connected with the intermediate portion of the bar 112, as shown in Fig. 14, and extends back far enough so that it may be operated from the driver's seat. It will be evident that by moving the lever 114 longitudinally after the bar 112 has been unlocked, the forward portion of the yoke 83 will be raised or lowered, thereby changing its angular position and varying the pitch of the sickle bars mounted on the finger bars.

115—116 indicate the sickle bars which are mounted upon the finger bars 73—74, respectively, and reciprocate thereon. The manner in which the sickle bars are mounted is best shown in Figs. 5 and 6, from an inspection of which it will be seen that a slide bar 117 is secured to the under side of the sickle bar adjacent to its rear margin, and plates 118 are secured to the upper side of the sickle bar and extend over the adjacent portion of the finger bar upon the upper surface of which they bear. The rear margins of these plates 118 are beveled, as best shown in Fig. 5, the upper portions of these plates being overlapped by retaining blocks 119 secured to the finger bar by bolts 120. The slide bars 117 fit in grooves in the fingers 121 of the finger bar placed adjacent to the forward margin of the finger bar, as shown in Fig. 5. Thus the sickle bars are held properly in operative position. As shown in Fig. 6, the cutting edges of the sickles are beveled on their under sides instead of on their upper sides, as has heretofore been the usual practice, and they operate in connection with ledger plates 122 secured to the under sides of the overlying portions 121ª of the fingers 121. By arranging and mounting the sickle bars in the manner described, the blocks 119 operate to hold the cutting edges of the sickles in proper operating relation to the ledger plates, and insure efficient operation of the sickles.

The sickle bars are reciprocated in unison by a vertically-disposed rock-shaft 123, as shown in Figs. 3 and 8. As shown in Fig. 3, the upper portion of said shaft is mounted in a suitable bearing 124 provided at the forward end portion of the front frame, and its lower end is mounted in a bearing 125 carried by the bracket 85. At its lower end the rock-shaft 123 carries a crank 126 which extends rearwardly and carries at its rear end a rectangular yoke 127, as shown in Figs. 4 and 8. This yoke embraces a bearing block 128 which is mounted upon the stem 129 of a yoke 130 which carries a pivot 131, as best shown in said figures. The sickle bars 115—116 are connected to the pivot 131 by plates 132—133 which are secured to said sickle bars adjacent to their inner ends, and are provided with sleeves 134—135 which fit upon said pivot. Thus the sickle bars are connected with the crank 126 by a connection in the nature of a universal coupling which is sufficiently flexible to accommodate itself to the different angular adjustments of the finger and sickle bars.

For rocking the rock-shaft 123 to actuate the sickle bars, it is provided at its upper end with a crank 136, as shown in Figs. 2 and 3, said crank being connected by a connecting rod 137 with an eccentric strap 138, shown in Fig. 11. The connection between the rod 137 and the eccentric strap 138 is adjustable, as shown in the latter figure, so that the stroke of the sickle bars may be varied. This is best accomplished by threading the rear end of the rod 137 and screwing it into a sleeve 139, which forms a part of the eccentric strap. A lock nut 140 secures the parts in fixed relation to each other. The eccentric strap 138 operates upon an eccentric 141 carried by a transverse shaft 142 mounted upon the rear portion of the front frame, as shown in Fig. 2. As there shown, the shaft 142 is mounted in suitable bearings in the members 52, 54, and 55. The shaft 142 is driven from the shaft 32 mounted on the tractor frame, the devices employed for that purpose being as follows: 143 indicates a bevel pinion mounted on one end portion of the shaft 32, as shown in Figs. 2 and 15. Said bevel pinion meshes with a bevel gear 144 loosely mounted upon a longitudinally-extending shaft 145 carried at one side of the rear frame 17. Both these gears are enclosed in a housing 146, as shown in Fig. 15. 147 indicates a clutch member connected with the hub of the bevel gear 144, and 148 indicates a co-acting clutch member mounted on a feather on the shaft 145 so that it rotates therewith and is movable longitudinally thereof. The clutch member 148 is moved into and out of engagement with the clutch member 147 by a yoke lever 149 mounted on a pivot 150 carried by a bracket 151 which also forms a bearing for the shaft 145, as shown in Fig. 15. The lever 149 is connected by a link 152 with an operating lever 153 arranged near the driver's seat, as shown in Fig. 2, so that he may readily move the clutch member 148 into or out of engagement with the clutch member 147. At its forward end the shaft 145 carries one member 154 of a universal coupling, the other member 155 of which is pivotally connected to a sleeve 156 having a non-circular bore which receives the correspondingly shaped rear end of a connecting shaft 157, these parts forming a telescopic connection. The forward end of the latter shaft is connected by a universal coupling 158 with a shaft 159 mounted on the cross bar 51, as shown in Fig. 2.

The latter shaft carries a bevel gear 160 which meshes with a bevel gear 161 carried by the shaft 142. By this construction, the shaft 32 drives the shaft 142, but said parts may readily be disconnected from each other to permit the front frame and the parts carried by it to be disconnected from the tractor frame. The telescopic connection and universal joints associated therewith permit the front frame to be vertically adjusted without interfering with the operation of the driving mechanism. At any time when it is desired to drive the shaft 32 without driving the shaft 142 and the parts connected therewith, this may be accomplished by disconnecting the clutch member 147—148.

162—163 indicate two raker frames oppositely inclined to the longitudinal axis of the machine, and converging rearwardly. Their rear ends are spaced apart a distance approximately equal to the space between the traction wheels, as shown in Fig. 2. These rakers are on a somewhat lower level than the front frame 18, as shown in Fig. 1, and they are secured to the front frame by depending bars 164 arranged at convenient points, as shown in Fig. 2. The two raker frames and the parts carried by them are alike, and therefore the same reference numerals serve to indicate corresponding parts of both. Each of the rakers comprises a longitudinal shaft 165 journaled in suitable bearings in the opposite end portions of the raker frame, as shown in Fig. 10, said shaft being provided at one end with a worm gear 166 which meshes with a worm 167 carried by the shaft 142. The arrangement of these worms on the latter shaft is shown in Fig. 2. As there shown, the two sets of worms and worm gears are arranged to rotate the shafts 165 in opposite directions as viewed from the inner ends thereof, the shaft carried by the raker frame 162 rotating in a counter-clockwise direction, and that carried by the raker frame 163 rotating in a clockwise direction. 168—169 indicate triangular heads mounted upon the opposite end portions of the shaft 165 and rotating therewith, as shown in Figs. 9 and 10. 170 indicates three shafts loosely mounted in the arms of the heads 168—169, each of which shafts is provided with a series of spring teeth 171. The shafts 170 are also provided with crank arms 172 which carry rollers 173 adapted to travel in cam grooves 174 provided in stationary heads 175 secured to the opposite end portions of the raker frame. It will be obvious that as the shaft 165 rotates, the shafts 170 will revolve about it as an axis, and the rollers 173 traveling in the grooves 174 will consequently rock the shafts 170, thereby moving the teeth 171 through paths determined by the shape of the cam grooves. These grooves are so shaped as to bring the teeth to a substantially vertical position as they approach and move over the ground so that the hay cut by the mower is raked toward the center of the machine, and is also loosened. As shown in Fig. 2, the forward portions of the raker frames substantially aline with the guides 77—78, which direct the hay cut by the outer end portions of the mower toward the outer end portions of the rakers so that all the hay cut is acted upon by the rakers, and as successive teeth come into action it is gradually worked toward the longitudinal axis of the machine until the innermost teeth leave it in windrows which lie within the track of the traction wheels. As the rakers leave the hay in windrows between the wheels, it is not crushed or trampled down, and consequently can cure under more favorable conditions. In order to insure the stripping of the hay from the rake teeth, stripper bars 176 are provided between successive teeth, as shown in Figs. 9-10, said strippers being secured to the side bars of the raker frames, as shown in Fig. 9.

From the foregoing description, it will be manifest that the hay is not crushed or trampled down in advance of the mower, and that, although a very wide swath is cut, all the hay cut by both sickle bars is raked into a single loose windrow, which is left undisturbed by the passage over it of the machine so that it cures under favorable conditions and may subsequently be more easily taken up for the purpose of stacking it. The operator on the tractor frame always has a clear view of his course, and may guide the machine either by hand or by the use of the power operated steering mechanism or both, as he may prefer. The adjustments provided for as hereinbefore described may be made by the driver from his seat, and he also has control of the driving connections so that the mowing and raking devices may be thrown into or out of operation at his pleasure. The manner in which the driving connections are made permits the front frame with the parts carried by it to be easily disconnected from the tractor frame without disarranging any of the parts carried by the latter, so that it is left in shape to be used for other work.

I wish it to be understood that while I have described with considerable particularity the specific embodiment of my invention illustrated in the drawings, my invention is not restricted to the specific construction shown and described except in so far as details of construction are particularly claimed, but includes generically the subject-matter of the broader claims.

What I claim as my invention and desire to secure by Letters Patent, is:—

1. An agricultural implement comprising a frame, a transversely disposed mower connected therewith, devices back of said mower at opposite sides of the central longitudinal axis of the implement and operating to move the crop on the ground toward such longitudinal axis, and means for actuating said mower.

2. An agricultural implement comprising a frame, a transversely disposed mower connected therewith, oppositely disposed raking devices back of said mower and converging rearwardly at opposite sides of the central longitudinal axis of the implement whereby they operate to rake the crop on the ground toward said longitudinal axis, and means for actuating said raking devices.

3. An agricultural implement comprising a tractor element, a transversely disposed mower in advance thereof, devices between said mower and said tractor element at opposite sides of the central longitudinal axis of the implement and operating to move the crop on the ground toward such longitudinal axis, and means for actuating said mower and said crop moving devices.

4. An agricultural implement comprising a tractor element, a frame connected with the front portion thereof, a mower connected with said frame, devices back of said mower at opposite sides of the central longitudinal axis of the implement and operating to move the crop on the ground toward such longitudinal axis, and means for actuating said crop moving devices from said tractor element.

5. An agricultural implement comprising a frame, transversely-disposed finger bars in advance thereof and connected therewith to swing vertically about a longitudinal axis, sickle bars carried by said finger bars, a rock-shaft mounted to rock about a substantially vertical axis and connected with each of said sickle bars for actuating the same in unison, and means for rocking said rock-shaft.

6. An agricultural implement comprising a tractor element, transversely-disposed finger bars in advance thereof and connected therewith to swing vertically about a longitudinal axis, sickle bars carried by said finger bars, a rock-shaft mounted to rock about a substantially vertical axis and connected with each of said sickle bars for actuating the same in unison, and means operated from said tractor element for rocking said rock-shaft.

7. An agricultural implement comprising a tractor element, a separable frame in advance thereof transversely-disposed finger bars connected with said frame, sickle bars carried by said finger bars, a rock-shaft connected with both of said sickle bars for actuating the same in unison, and means mounted on said frame and detachably connected with and operated from said tractor element for rocking said rock-shaft.

8. An agricultural implement comprising a frame, transversely-disposed finger bars in advance thereof and connected therewith to swing vertically about a longitudinal axis, sickle bars carried by said finger bars, means for actuating said sickle bars, a lever and means actuated by said lever for simultaneously or separately swinging said finger bars vertically.

9. An agricultural implement comprising a frame, transversely-disposed finger bars connected therewith to swing vertically about a longitudinal axis, sickle bars carried by said finger bars, means for actuating said sickle bars, levers connected with said sickle bars respectively and adapted to be actuated to swing the same vertically, and means for actuating said levers either separately or simultaneously.

10. An agricultural implement comprising a frame, transversely-disposed finger bars connected therewith to swing vertically about a longitudinal axis, sickle bars carried by said finger bars, means for actuating said sickle bars, levers connected with said sickle bars respectively and adapted to be actuated to swing the same vertically, and a lever movable into engagement with either or both of said levers for actuating the same separately or simultaneously.

11. An agricultural implement comprising a frame, transversely-disposed finger bars in advance thereof and connected therewith, sickle bars carried by said finger bars, a rock-shaft mounted to rock about a substantially vertical axis and connected with each of said sickle bars for actuating the same, and a reciprocating bar for rocking said rock-shaft.

12. An agricultural implement comprising a tractor element, transversely-disposed finger bars in advance thereof and connected therewith, sickle bars carried by said finger bars, a rock-shaft mounted to rock about a substantially vertical axis and connected with each of said sickle bars for actuating the same, and reciprocating means driven from said tractor element for rocking said rock-shaft.

13. An agricultural implement comprising a tractor element, a separable frame in advance of said tractor element, transversely-disposed finger bars arranged in alinement with each other and connected with said frame, sickle bars carried by said finger bars, a rock-shaft mounted to rock about a substantially vertical axis and connected with the inner end of each sickle bar for actuating the same, and means mounted on said frame and driven from said tractor element for rocking said rock-shaft.

14. An agricultural implement comprising a frame, transversely-disposed finger bars arranged in alinement with each other in advance of said frame and connected therewith, sickle bars carried by said finger bars and connected together at their inner ends, a rock-shaft mounted to rock about a substantially vertical axis, a universal connection between said rock-shaft and said sickle bars, a transverse shaft mounted on said frame, means for rotating said shaft and means actuated by the rotation of said transverse shaft for rocking said rock-shaft.

15. An agricultural implement comprising a frame, transversely-disposed finger bars arranged in alinement with each other in advance of said frame and connected therewith, sickle bars carried by said finger bars and connected together at their inner ends, a rock-shaft mounted to rock about a substantially vertical axis, a universal connection between said rock-shaft and said sickle bars, a transverse shaft mounted on said frame, an eccentric mounted on said transverse shaft, a reciprocating rod operated by said eccentric and connected with said rock shaft for rocking the same, and means for rotating said transverse shaft.

16. An agricultural implement comprising a tractor element, raking devices in advance of and connected with said tractor element, said raking devices being arranged at opposite sides of the central longitudinal axis of the implement and converging rearwardly, means for rotating said raking devices in opposite directions and mowing devices in advance of said raking devices.

17. An agricultural implement comprising a tractor element, raking devices in advance of and connected with said tractor element, said raking devices being arranged at opposite sides of the central longitudinal axis of the implement and converging rearwardly, means driven from said tractor element for rotating said raking devices in opposite directions and mowing devices in advance of said raking devices.

18. An agricultural implement comprising a tractor element, raking devices in advance of and connected with said tractor element, said raking devices being arranged at opposite sides of the central longitudinal axis of the implement and converging rearwardly, means driven from said tractor element and detachably connected therewith for rotating said raking devices in opposite directions and mowing devices in advance of said raking devices.

19. An agricultural implement comprising a tractor element, a mower disposed transversely of said tractor element and in advance thereof, diagonally-disposed raking devices between said mower and said tractor element and operating to throw the material cut by said mower toward the central longitudinal axis of the implement, and means for operating said mower and said raking devices.

20. An agricultural implement comprising a tractor element, a mower disposed transversely of said tractor element and in advance thereof, diagonally-disposed raking devices between said mower and said tractor element and operating to throw the material cut by said mower toward the central longitudinal axis of the implement, and means driven from said tractor element for operating said mower and said raking devices.

21. An agricultural implement comprising a tractor element, a transversely-disposed mower in advance thereof and connected therewith, diagonally-disposed rotary raking devices at opposite sides of the implement extending from the end portions of said mower toward the central longitudinal axis of the implement, and means for driving said mower and said raking devices.

22. An agricultural implement comprising a tractor element, a transversely-disposed mower in advance thereof and connected therewith, diagonally-disposed rotary raking devices at opposite sides of the implement extending from the end portions of said mower toward the central longitudinal axis of the implement, means for driving said mower and said raking devices, and deflectors carried by the end portions of said mower.

23. An agricultural implement comprising a tractor element, transversely-disposed finger bars in advance thereof and connected therewith, said finger bars being arranged to swing vertically, sickle bars carried by said finger bars, means for actuating said sickle bars, rotary raking devices diagonally-disposed at opposite sides of the implement and extending from the outer end portions of said sickle bars toward the central longitudinal axis of the implement, and means for rotating said raking devices.

24. A hay machine comprising a tractor element, means in advance of said tractor element for cutting the hay, and means between said cutting means and said tractor element for raking the hay on the ground into windrows lying between the wheels of said tractor element.

25. An agricultural implement comprising a tractor frame, propelling and steering wheels and a motor carried thereby, a front frame arranged in advance of said tractor frame, a caster wheel centrally supporting the forward portion of said front frame, finger bars pivotally connected with the central portion of said front frame in advance of said caster wheel to swing vertically about a longitudinal axis and extending transversely of the path of the tractor, sickle bars carried by said finger bars, and means driven by said motor for reciprocating said sickle bars.

26. An agricultural implement comprising a tractor frame, propelling and steering wheels and a motor carried thereby, a front frame arranged in advance of said tractor frame and pivotally connected therewith, a caster wheel connected with and supporting the forward portion of said front frame, mowing devices in advance of said caster wheel and connected with said front frame and disposed transversely of the path of the tractor, means for driving said mowing devices from said motor, and means cooperating with said caster wheel for vertically adjusting said front frame thereon.

27. An agricultural implement comprising a tractor frame, propelling and steering wheels and a motor carried thereby, a front frame arranged in advance of said tractor frame and pivotally connected therewith, a caster wheel supporting the forward portion of said front frame, finger bars pivotally connected with said front frame in advance of said caster wheel and extending transversely of the path of the tractor, sickle bars carried by said finger bars, means driven by said motor for reciprocating said sickle bars, and means cooperating with said caster wheel for vertically adjusting said front frame thereon.

28. An agricultural implement comprising a tractor frame, propelling and steering wheels and a motor carried thereby, a front frame arranged in advance of said tractor frame and detachably connected therewith, a caster wheel supporting the forward portion of said front frame, mowing devices connected with said front frame and disposed transversely of the path of the tractor, means for driving said mowing devices from said motor, raking devices connected with said front frame at opposite sides thereof between said mowing devices and the tractor frame, and means driven by said motor for actuating said raking devices.

29. An agricultural implement comprising a tractor frame, propelling and steering wheels and a motor carried thereby, a front frame arranged in advance of said tractor frame and detachably connected therewith, a caster wheel supporting the forward portion of said front frame, finger bars pivotally connected with said front frame in advance of said caster wheel and extending transversely of the path of the tractor, sickle bars carried by said finger bars, raking devices connected with said front frame at opposite sides thereof between said finger bars and the tractor frame, and means driven by said motor for actuating said raking devices.

30. An agricultural implement comprising a tractor frame, propelling and steering wheels and a motor carried thereby, a front frame arranged in advance of said tractor frame and pivotally connected therewith, a caster wheel supporting the forward portion of said front frame, mowing devices connected with said front frame and disposed transversely of the path of the tractor, means for driving said mowing devices from said motor, raking devices connected with said front frame at opposite sides thereof between said mowing devices and the tractor frame, and means driven by said motor for actuating said raking devices.

31. An agricultural implement comprising a tractor frame, propelling and steering wheels and a motor carried thereby, a front frame arranged in advance of said tractor frame and pivotally connected therewith, a caster wheel supporting the forward portion of said front frame, finger bars pivotally connected with said front frame in advance of said caster wheel and extending transversely of the path of the tractor, sickle bars carried by said finger bars, means driven by said motor for reciprocating said sickle bars, raking devices connected with said front frame at opposite sides thereof between said finger bars and the tractor frame, and means driven by said motor for actuating said raking devices.

32. An agricultural implement comprising a tractor frame, propelling and steering wheels and a motor carried thereby, a front frame arranged in advance of said tractor frame and detachably connected therewith, rotary raking devices connected with said front frame, means for rotating said raking devices and mowing devices in advance of said raking devices.

33. An agricultural implement comprising a tractor frame, propelling and steering wheels and a motor carried thereby, a front frame arranged in advance of said tractor frame and detachably connected therewith, rotary raking devices connected with said front frame, means operated by said motor for rotating said raking devices and mowing devices in advance of said raking devices.

34. An agricultural implement comprising a tractor frame, propelling and steering wheels and a motor carried thereby, a front frame arranged in advance of said tractor frame and detachably connected therewith, diagonally-disposed raking devices connected with said front frame at opposite sides thereof, means operated by said motor for driving said raking devices and mowing devices in advance of said raking devices.

35. An agricultural implement comprising a tractor frame, propelling and steering wheels and a motor carried thereby, a front frame arranged in advance of said tractor frame and detachably connected therewith, rotary raking devices connected with said front frame, means for rotating said raking devices, mowing devices in advance of said raking devices, and a caster wheel supporting the forward portion of said front frame.

36. An agricultural implement comprising a tractor frame, propelling and steering wheels and a motor carried thereby, a front frame arranged in advance of said tractor frame and detachably connected therewith, diagonally-disposed raking devices connected with said front frame at opposite sides thereof, means operated by said motor for driving said raking devices, mowing devices in advance of said raking devices, and a caster wheel supporting the forward portion of said front frame.

37. An agricultural implement comprising a tractor frame, propelling and steering wheels and a motor carried thereby, a front frame arranged in advance of said tractor frame and detachably connected therewith, rotary raking devices connected with said front frame, means for rotating said raking devices, mowing devices in advance of said raking devices, a caster wheel supporting the forward portion of said front frame, and means for vertically adjusting said front frame on said caster wheel.

38. An agricultural implement comprising a tractor frame, propelling and steering wheels and a motor carried thereby, a front frame arranged in advance of said tractor frame and detachably connected therewith, diagonally-disposed raking devices connected with said front frame at opposite sides thereof, means operated by said motor for driving said raking devices, mowing devices in advance of said raking devices, a caster wheel supporting the forward portion of said front frame, and means for vertically adjusting said front frame on said caster wheel.

39. An agricultural implement comprising a tractor frame, a motor mounted thereon, a front frame detachably connected with said tractor frame, mowing devices connected with said front frame, raking devices connected with said front frame, driving mechanism for said mowing devices and for said raking devices mounted on said front frame and detachable therewith, and separable connections between said motor and said driving mechanism.

40. An agricultural implement comprising a tractor frame, a motor mounted thereon, a front frame detachably connected with said tractor frame, raking devices connected with said front frame, driving mechanism for said raking devices mounted on said front frame and detachable therewith, separable connections between said motor and said driving mechanism and mowing devices in advance of said raking devices.

41. An agricultural implement comprising a tractor frame, transversely-disposed finger bars in advance thereof and connected therewith, said finger bars being arranged to swing vertically, a lever, and means adapted to be actuated by said lever for simultaneously or separately raising or lowering said finger bars.

42. An agricultural implement comprising a tractor frame having propelling and steering wheels, mowing devices in advance of said tractor frame, ground raking devices between said mowing devices and said tractor frame, power operated means for driving said mowing devices, and power operated means for actuating said raking devices.

43. An agricultural implement comprising a tractor frame having propelling and steering wheels, mowing devices in advance of said tractor frame, angularly disposed ground raking devices back of said mowing devices and forward of the steering wheels, power operated means for driving said mowing devices, and power operated means for actuating said raking devices.

44. An agricultural implement comprising a tractor frame having propelling and steering wheels and a motor, ground raking devices in advance of the tractor frame, mowing devices in advance of said raking devices, means operated by said motor for driving said raking devices, and means operated by said motor for driving said mowing device.

45. An agricultural implement comprising a tractor having propelling means at the rear and steering means at the front, a frame disposed in advance of said steering means and pivotally connected with the tractor to swing vertically, agricultural implement means mounted on said frame, ground engaging castering means supporting the forward portion of said frame, means on said frame cooperating with said castering means to lift the front portion of said frame relatively to said castering means, and means extending back of said steering means for actuating said lifting means.

46. In an agricultural implement, a tractor comprising a frame having a pair of substantially parallel longitudinal frame bars, a pair of traction wheels supporting the rear ends of said frame bars, a motor for driving said traction wheels, a pair of dirigible wheels supporting the front ends of said frame bars, said dirigible wheels being disposed in planes outside of said frame bars, a transverse bar constituting a part of said frame and extending across the front ends of said longitudinal bars in advance of the axes of said dirigible wheels, the ends of said transverse bars extending laterally beyond the treads of said dirigible wheels, and an agricultural implement mounted on said transverse bar in advance of said traction wheels.

47. An agricultural implement comprising a tractor frame, a motor carried thereby, propelling means at the rear of said frame, steering means at the front thereof, a front frame arranged in advance of said tractor frame and pivotally connected therewith to swing vertically, agricultural implement devices carried on said front frame, castering ground engaging means supporting the forward portion of said front frame, adjusting means mounted on said front frame and operatively connected to apply pressure against said ground engaging means to raise such frame, and actuating means operatively connected with said adjusting means and extending rearwardly of said steering means for manipulation by the operator from his position on the tractor frame.

48. An agricultural implement comprising a tractor frame, a pair of motor driven traction wheels supporting the rear end of said frame, a pair of dirigible wheels supporting the front end of said frame, a front cross bar on said frame disposed forwardly of the axes of said dirigible wheels and above the treads of said wheels, the ends of said crossbar projecting outwardly beyond said frame and said dirigible wheels, diagonal brace bars between said frame and the outwardly projecting portions of said cross-bar, hanger members depending from said cross-bar, and implement means pivotally connected with said hanger members.

CHARLES E. WHITE.